United States Patent
Kim

(10) Patent No.: US 9,676,254 B2
(45) Date of Patent: Jun. 13, 2017

(54) ECO-HUMIDIFIER FOR VEHICLE

(71) Applicant: Hyundai Motor Company, Seoul (KR)

(72) Inventor: Jee-Jung Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 91 days.

(21) Appl. No.: 14/934,977

(22) Filed: Nov. 6, 2015

(65) Prior Publication Data

US 2016/0200179 A1 Jul. 14, 2016

(30) Foreign Application Priority Data

Jan. 14, 2015 (KR) .................. 10-2015-0006515

(51) Int. Cl.
| | |
|---|---|
| *F25B 27/00* | (2006.01) |
| *F24J 2/08* | (2006.01) |
| *B01F 3/04* | (2006.01) |
| *B60H 3/02* | (2006.01) |

(52) U.S. Cl.
CPC .............. *B60H 3/022* (2013.01); *B01F 3/04* (2013.01); *F24J 2/08* (2013.01); *F25B 27/002* (2013.01); *B60H 2003/026* (2013.01)

(58) Field of Classification Search
CPC .............. F25B 27/002; F24J 2/08; B01F 3/04
USPC .................. 126/680, 698; 261/30, 72.1, 141
See application file for complete search history.

(56) References Cited

U.S. PATENT DOCUMENTS

| 2010/0243432 A1 | 9/2010 | Ikemizu | |
|---|---|---|---|
| 2011/0259319 A1* | 10/2011 | Yabe | F24J 2/0488 126/573 |

FOREIGN PATENT DOCUMENTS

| JP | 2006-139620 A | 6/2006 |
|---|---|---|
| JP | 2007-212125 A | 8/2007 |
| JP | 2011-078622 A | 4/2011 |
| JP | 2013-240591 A | 12/2013 |
| KR | 10-2010-0074330 A | 7/2010 |
| KR | 10-1121824 B1 | 3/2012 |
| KR | 10-1308408 B1 | 9/2013 |

* cited by examiner

*Primary Examiner* — Robert A Hopkins
(74) *Attorney, Agent, or Firm* — Mintz Levin Cohn Ferris Glovsky and Popeo, P.C.; Peter F. Corless

(57) ABSTRACT

An eco-humidifier for a vehicle performs a humidifying function by using solar light energy without separate power, and includes: a case having space to accommodate water and in which a light collecting device is installed on a top of the case so as to concentrate solar light; multiple metallic nano particles that sink in the water accommodated in the case to absorb the solar light passing through the light collecting device; and a condenser, an evaporator, and a blower motor connected with one upper side of the case via a connection pipe, where the metallic nano particles are heated by a surface Plasmon resonance phenomenon to vaporize the water to vapor.

12 Claims, 3 Drawing Sheets

ECO-HUMIDIFIER FOR VEHICLE

CROSS-REFERENCE TO RELATED APPLICATION

This application claims under 35 U.S.C. §119(a) the benefit of Korean Patent Application No. 10-2015-0006515 filed Jan. 14, 2015, the entire contents of which are incorporated herein by reference.

BACKGROUND (a) Technical Field

The present invention relates to a humidifier for a vehicle, and more particularly, to an eco-humidifier for a vehicle which is configured such that metallic nano particles that sink in water absorb rays of the sun by using a surface Plasmon resonance phenomenon to perform a humidifying function without separate power.

(b) Description of the Related Art

An air conditioner of a vehicle which is used for heating, ventilation, and air conditioning of an interior of the vehicle is used to provide a more comfortable environment to a driver by maintaining a temperature of the vehicle in an appropriate state regardless of a change in external temperature.

The air conditioner is constituted by a compressor compressing refrigerant, a condenser condensing and liquefying the compressed refrigerant, a thermal expansion valve (TXV) thermally expanding the liquefied refrigerant and making the thermally expanded refrigerant into low-temperature and low-pressure refrigerant, and an evaporator evaporating the expanded refrigerant. In respective stages, the refrigerant exists in different phases of high-temperature and high-pressure gas, room-temperature and high-pressure liquid, low-temperature and low-pressure liquid, and low-temperature and low-pressure gas.

However, in the air conditioner in the related art, when a heater is operated for a long time, moisture in the vehicle is continuously evaporated by a high temperature, and as a result, the inside of the vehicle is dried and a passenger may experience discomfort or dryness of the skin.

Therefore, a technology in which a humidifier is installed in the vehicle has been pursued, but since a space capable of storing humidifying water is limited and an ultrasonic oscillator is required to oscillate water and convert the oscillated water into vapor, and since a humidifying action is performed only in heating, it is impossible to continuously maintain appropriate humidity, and production costs may be prohibitive.

Meanwhile, in recent years, due to increasing concern about climate change, there is a trend of increased interest in new regeneration energy technology across industrial fields including vehicle development, and research into utilization of solar energy in vehicles has been pursued.

Nevertheless, technological development of an interior environment of the vehicle is limited, and research into an apparatus that actively applies the new regeneration energy to the vehicle is incomplete.

Accordingly, the need for a humidifier for a vehicle which can actively utilize solar energy while providing a comfortable riding environment to the driver by preventing the inside of the vehicle from being dried is acute.

The above information disclosed in this Background section is only for enhancement of understanding of the background of the invention and therefore it may contain information that does not form the prior art that is already known in this country to a person of ordinary skill in the art.

SUMMARY

The present invention has an object to provide an eco-humidifier for a vehicle which can perform a humidifying function by utilizing solar energy without separate power.

Further, another object of the present invention is to provide an eco-humidifier for a vehicle which can perform antibiotic, sterilization, and purification functions by using metallic nano particles and selectively provide a humidification amount desired by a user according to an interior environment of the vehicle.

Technical objects to be solved by the present invention are not limited to the aforementioned technical objects and unmentioned technical objects will be clearly understood by those skilled in the art from the specification and the appended claims.

In one aspect, the present invention provides an eco-humidifier for a vehicle including: a case having a space so as to accommodate water therein and in which a light collecting device is installed on a top of the case so as to concentrate solar light; multiple metallic nano particles that sink in the water accommodated in the case to absorb the solar light passing through the light collecting device; and a condenser, an evaporator, and a blower motor connected with an upper side of the case via a connection pipe, and the metallic nano particles are heated by a surface Plasmon resonance phenomenon to vaporize the water to vapor.

In a preferred embodiment, the case may be installed on an interior dashboard of the vehicle, or a sunroof mounted on a roof panel of the vehicle.

In another preferred embodiment, the light collecting device may be configured as a Fresnel lens, and the metallic nano particles may be at least one of gold (Au) nano particle, a silver (Ag) nano particle, and a copper (Cu) nano particle.

In still another preferred embodiment, the eco-humidifier for a vehicle may further include an opening/closing valve installed on the connection pipe connecting the case and the condenser and controlled by an electronic control unit (ECU) of the vehicle to control the amount of the vapor passing through the connection pipe.

In a further preferred embodiment, an eco-humidifier for a vehicle can include: a case having a space configured to accommodate water therein; a light collecting device installed in a top of the case, the light collecting device configured to concentrate solar light; and multiple metallic nano particles made of at least one of gold, silver, and copper, the metallic nano particles configured to sink in the water accommodated in the case to absorb the solar light passing through the light collecting device, where the metallic nano particles are heated by a surface Plasmon resonance phenomenon to vaporize the water to vapor In the present invention having the above configuration, since water is vaporized into vapor by using metallic nano particles absorbing solar light passing through a light collecting device and thereafter, the vapor can be used for a humidifying function of the vehicle, the humidifying function can be semipermanently achieved without separate power.

Further, the present invention has an advantage in that since a case accommodating water can be installed on an interior dashboard of the vehicle or a sunroof mounted on a roof panel, a space capable of storing humidifying water is increased as compared with a humidifier for a vehicle in the related art.

In addition, since the present invention can be implemented by using not separate power but a solar energy, the present invention is environment-friendly and since 80% or more of the absorbed solar energy can be used for generating vapor, efficiency remarkably increases.

Moreover, metallic nano particles (gold nano particles, silver nano particles, or copper nano particles) used in the present invention have antibiotic, sterilization, and purification functions, proliferation of viruses/bacteria which is problematic in the humidifier for the vehicle in the related art is suppressed.

Furthermore, in the present invention, a humidification degree desired by a user can be selected and driven stepwise by using an electronic opening/closing valve controlled by an ECU of the vehicle to prevent a disease of the user, and the like and help a skin health, thereby increasing merchantability of the vehicle.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
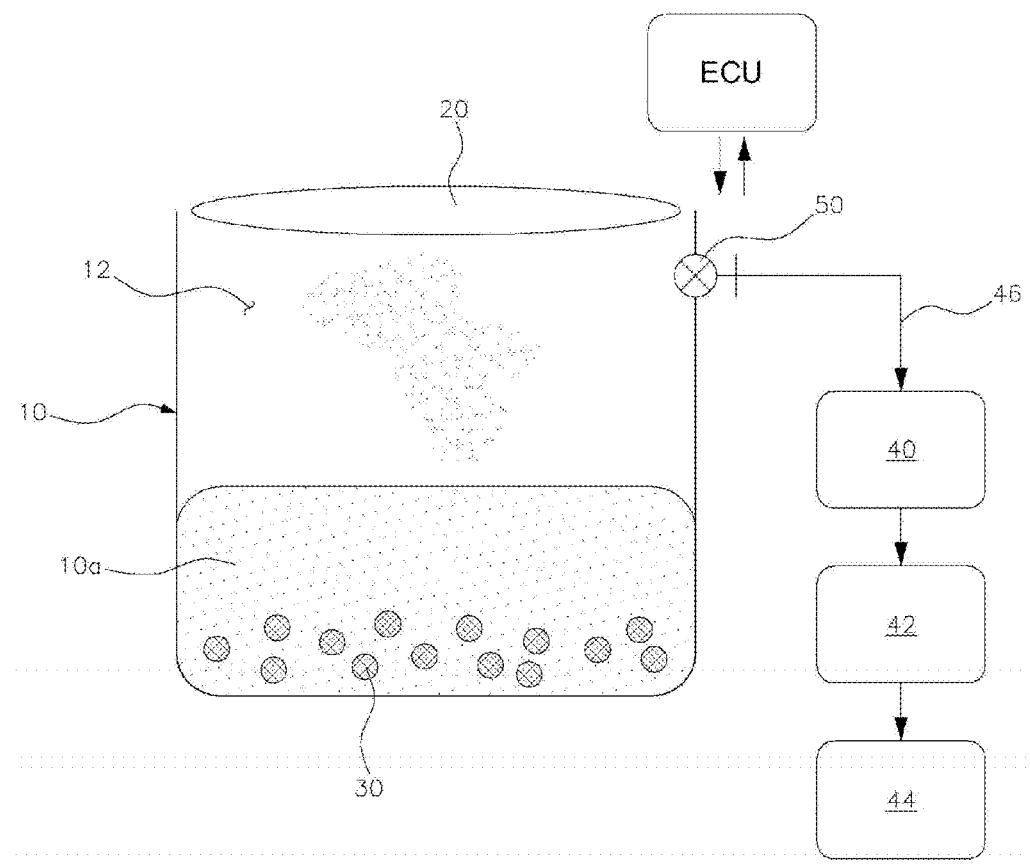
FIG. 1 is a diagram schematically illustrating an eco-humidifier for a vehicle according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described more fully hereinafter with reference to the accompanying drawings so that those skilled in the art easily implement the present invention. However, the present invention can be realized in various different forms, and is not limited to the embodiments described herein.

Parts which are not related with the description are omitted in order to clearly describe the present invention in the drawings and like reference numerals designate like elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

FIG. 1 is a diagram schematically illustrating an eco-humidifier for a vehicle according to an embodiment of the present invention.

As illustrated in FIG. 1, an eco-humidifier for a vehicle according to an embodiment of the present invention includes a case 10 having a space 12 so as to accommodate water 10a therein, the case 10 having a light collecting device 20 installed at a top (i.e., at or near the top of the case 10) to collect solar light, multiple metallic nano particles 30 that sink in the water 10a accommodated in the case 10 to absorb the solar light passing through the light collecting device 20, and a condenser 40 connected with an upper side of the case 10 via a connection pipe 46, an evaporator 42, and a blower motor 44.

As illustrated in FIG. 1, in the case 10, a top is opened and a bottom is closed, the space 12 is formed in the case 10, and a predetermined amount of water 10a used for a humidifying function is accommodated in the internal space 12.

The case 10 may be formed in a shape such as a circular pillar or an oval pillar, and when the case 10 is coupled to a component installed in a vehicle, the case 10 may be formed in an integrated form according to the shape of the component.

In detail, the case 10 according to the embodiment of the present invention is preferably installed on an interior dashboard (not illustrated) of the vehicle or a sunroof (not illustrated) mounted on a roof panel of the vehicle, and as a result, the space may be large enough so as to accommodate a quantity of water without influencing a layout in the vehicle.

The dashboard represents a part in which various instruments required for driving are installed on the front of a driver's seat and a passenger's seat of the vehicle, and may be constituted by an instrument panel displaying information required for driving, a steering wheel for operating a direction of the vehicle, a center fascia with control plates of an audio system and an air conditioner, and the like, and the sunroof is a component installed to open/close an opening formed on the roof panel for internal ventilation and openness of the vehicle.

The light collecting device 20 is installed on the top of the case 10 to collect the solar light directed into the case 10, and one or multiple light collecting devices 20 may be installed by considering the required amount of vapor, and the like.

The light collecting device 20 preferably is formed integrally with the case 10 to completely seal the top of the case, and in some cases, the light collecting device 20 may be detachably coupled to the top of the case 10 so that a user can easily remove the light collecting device 20.

As the light collecting device 20, a lens collecting the solar light such as a convex lens or a light collecting lens may be used, and the light collecting device 20 according to the embodiment of the present invention is preferably configured by a Fresnel lens. The Fresnel lens represents a lens in which a part around the center is thinned by cutting crystalline large magnifying glass into tens to hundreds of concentric circles and has a characteristic that light is more concentrated without increasing the thickness of the lens. The user variously forms the Fresnel lens by considering the size of the case, the amount of the accommodated water, an installation position of the case, and the like to configure the optimal light collecting device 20.

The multiple metallic nano particles 30 sink in the water 10a accommodated in the case 10, and as the metallic nano particles 30 absorb the solar light to be heated to 100° C. or more, the water 10a is vaporized to vapor.

The metallic nano particles 30 represent metallic particles of which 3D outer dimensions are each about 1 nm to 100 nm, and the metallic nano particles 30 according to the embodiment of the present invention are preferably at least one of gold (Au) nano particles, silver (Ag) nano particles, and copper (Cu) nano particles, or combinations of these types of particles.

When the metallic nano particles 30 absorb the solar light passing through the light collecting device 20, and as a result, the surface the metallic nano particles 30 is rapidly heated, and such an action is achieved by a surface Plasmon resonance phenomenon.

The surface Plasmon resonance phenomenon represents a phenomenon in which a field amplified through absorption of light is induced under a condition in which a unique wave vector of a collective oscillation motion of electrons on the surface of jewelry, which have a nano size and a wave vector of incident light coincide with each other.

The surface Plasmon resonance phenomenon is primarily widely used as a surface measurement principle that measures an adsorption degree of a sample on the metallic nano particles, and in particular, is a principle that is widely used for a bio-sensor that detects the quantity of samples through a change in color.

However, related art that implements the humidifier for the vehicle in detail by using the incident solar light and the surface Plasmon resonance phenomenon of the metallic nano particles 30 like the present invention has been not yet been developed.

Further, since it is known that the metallic nano particles 30 have antibiotic, sterilization, and purification functions, the present invention is effective in suppressing proliferation of viruses/bacteria, which is problematic in the humidifier for the vehicle in the related art.

Figure 2:
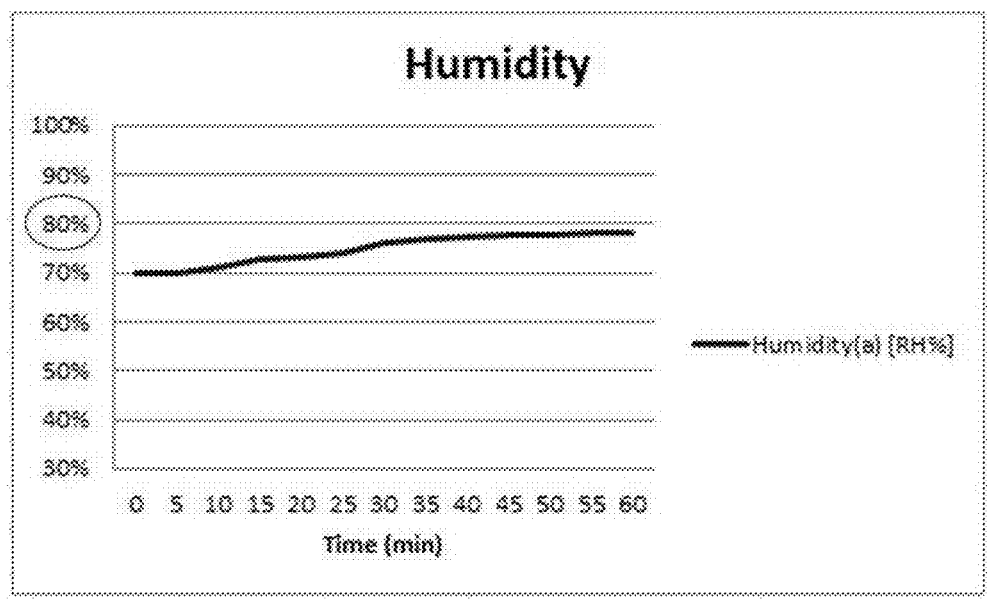
FIG. 2 is a chart in which humidity in a case is measured when there is no gold nano particle accommodated in the case.
Figure 3:
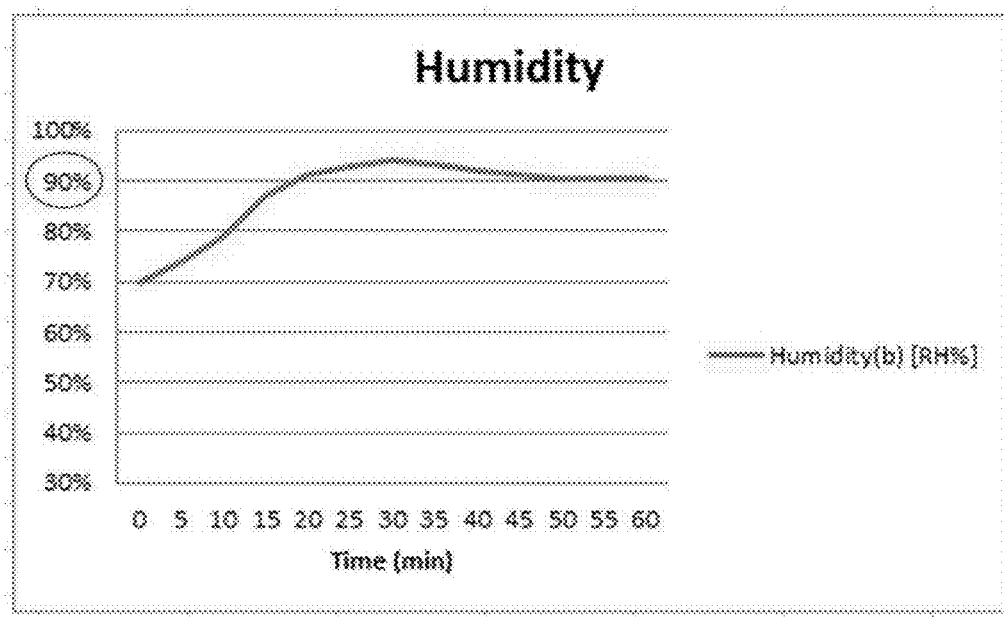
FIG. 3 is a chart in which the humidity in the case is measured when there is a gold nano particle accommodated in the case.

FIG. 2 is a chart in which humidity in a case is measured when there is no gold (Au) nano particle accommodated in the case. FIG. 3 is a chart in which the humidity in the case is measured when there is the gold (Au) nano particle accommodated in the case at a room temperature of 25° C.

As illustrated in FIG. 2, when there is no gold nano particle in the water 10a accommodated in the case 10, the humidity in the case 10 does not exceed about 80%, while as illustrated in FIG. 3, when there is the gold nano particle in the water 10a accommodated in the case 10, the humidity in the case 10 reaches approximately 90%.

In particular, those skilled in the art would know that as compared with the case where there is no gold nano particle at the room temperature of 25° C., in the case where there is the gold nano particle, the humidity in the case 10 increases and when the solar light is incident to heat the gold nano particle, both cases are further remarkably different from each other in humidity.

As illustrated in FIG. 1, the case 10 is connected to the condenser 40, the evaporator 42, and the blower motor 44 via the connection pipe 46, and the vapor generated in the case 10 flows through the connection pipe 46.

As described above, since the metallic nano particles 30 heated by the solar light passing through the light collecting device 20 are heated to 100° C. or higher, vapor which is first vaporized has a very high temperature.

Therefore, the vapor is transferred to the condenser 40 through the connection pipe 46 and first condensed and thereafter, evaporated through the evaporator 42 to be phase-changed to low-temperature and low-pressure gas and thereafter, supplied to the interior of the vehicle through the blower motor 44.

As the condenser 40, the evaporator 42, and the blower motor 44, the condenser, the evaporator, and the blower motor used in an air-conditioner of the vehicle may be just used or the condenser, the evaporator, and the blower motor may be separately manufactured and used according to the present invention.

The opening/closing valve 50 is installed on the connection pipe 46 connecting the case 10 and the condenser 40 and the opening/closing valve 50 is controlled by an electronic control unit (ECU) of the vehicle to control the amount of the vapor passing through the connection pipe.

The opening/closing valve 50 may operate as the user selects a desired humidity degree stepwise by pressing buttons provided in the vehicle or automatically operate according to humidity designed by the user.

As described above, the eco-humidifier for the vehicle according to the embodiment of the present invention performs the humidifying function only by pure solar light without battery consumption of the vehicle, and as a result, an environment-friendly component such as an ultrasonic oscillator is not used, thereby reducing production costs of the vehicle.

Although the present invention described as above is not limited by the aforementioned embodiments and the accompanying drawings and it will be apparent to those skilled in the art that various substitutions, modifications, and changes can be made within the scope without departing from the technical spirit of the present invention.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An eco-humidifier for a vehicle, comprising:
    a case having a space configured to accommodate water therein, the case having a top for receiving a light collecting device configured to concentrate solar light;
    multiple metallic nano particles that sink in the water accommodated in the case to absorb the solar light passing through the light collecting device; and
    a condenser, an evaporator, and a blower motor connected with an upper side of the case via a connection pipe,
    wherein the metallic nano particles are heated by a surface Plasmon resonance phenomenon to vaporize the water to vapor.

2. The eco-humidifier of claim 1, wherein the case is installed on an interior dashboard of the vehicle or a sunroof mounted on a roof panel of the vehicle.

3. The eco-humidifier of claim 1, wherein the light collecting device is configured as a Fresnel lens.

4. The eco-humidifier of claim 1, wherein the metallic nano particles comprise at least one of a gold (Au) nano particle, a silver (Ag) nano particle, or a copper (Cu) nano particle.

5. The eco-humidifier of claim 1, wherein the metallic nano particles include at least one of gold, silver, and copper particles.

6. The eco-humidifier of claim 1, wherein the metallic nano particles are selected from the group consisting of: gold (Au) nano particles, a silver (Ag) nano particles, and copper (Cu) nano particles.

7. The eco-humidifier of claim 1, further comprising:
    an opening/closing valve installed on the connection pipe connecting the case and the condenser, the opening/closing valve being controlled by an electronic control unit (ECU) of the vehicle to control the amount of the vapor passing through the connection pipe.

8. An eco-humidifier for a vehicle, comprising:
    a case having a space configured to accommodate water therein;
    a light collecting device installed in a top of the case, the light collecting device configured to concentrate solar light; and
    multiple metallic nano particles made of at least one of gold, silver, and copper, the metallic nano particles configured to sink in the water accommodated in the case to absorb the solar light passing through the light collecting device,
    wherein the metallic nano particles are heated by a surface Plasmon resonance phenomenon to vaporize the water to vapor.

9. The eco-humidifier of claim 8, further comprising a condenser, an evaporator, and a blower motor connected with an upper side of the case via a connection pipe.

10. The eco-humidifier of claim 9, further comprising:
    an opening/closing valve installed on the connection pipe connecting the case and the condenser, the opening/closing valve being controlled by an electronic control unit (ECU) of the vehicle to control the amount of the vapor passing through the connection pipe.

11. The eco-humidifier of claim 8, wherein the case is installed on an interior dashboard of the vehicle or a sunroof mounted on a roof panel of the vehicle.

12. The eco-humidifier of claim 8, wherein the light collecting device is configured as a Fresnel lens.

* * * * *